April 12, 1932.    D. W. ROPER    1,853,882
DIFFERENTIAL METHOD OF INDICATING TROUBLE ON AN OIL FILLED CABLE
Filed Jan. 6, 1928    3 Sheets-Sheet 1
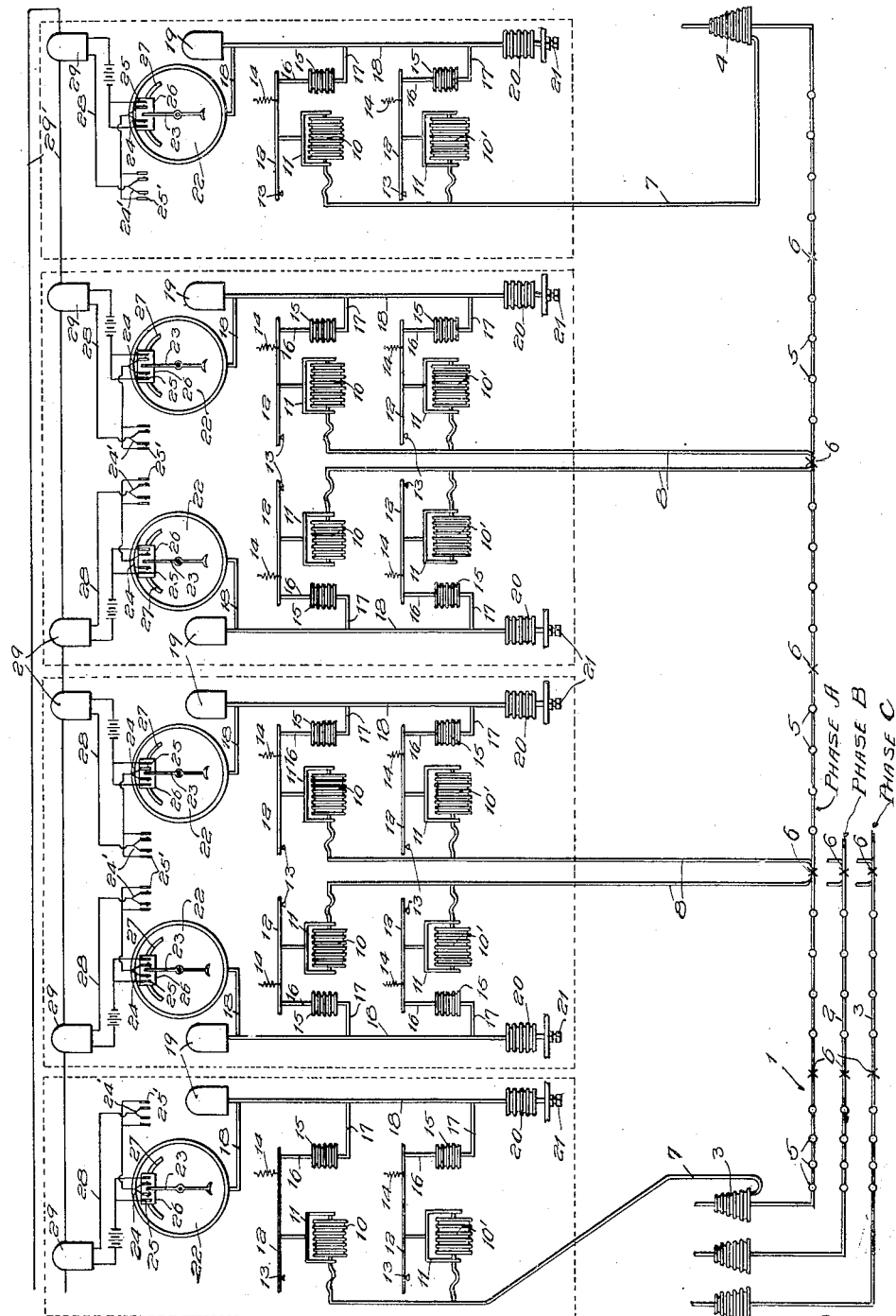

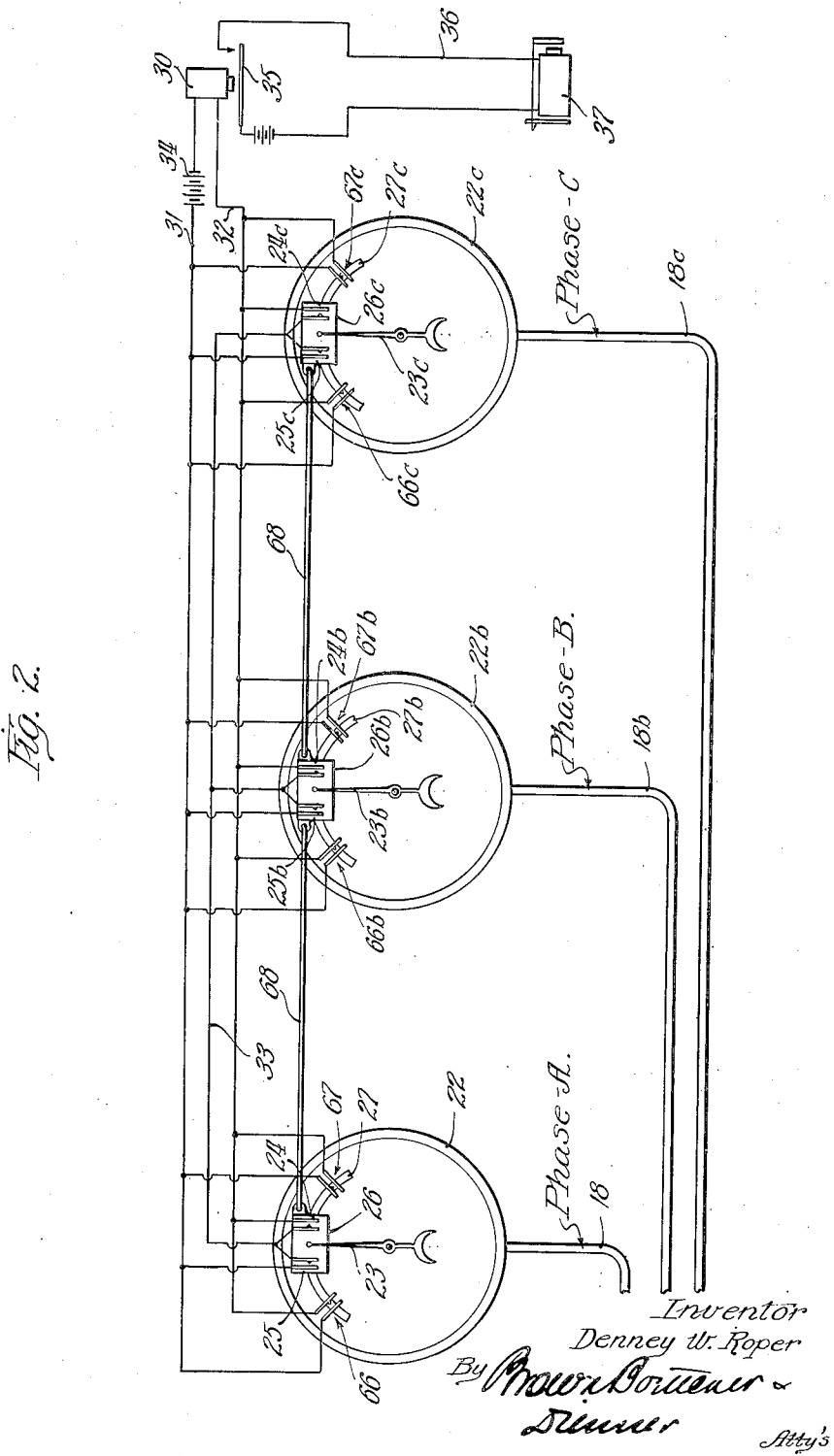

April 12, 1932. D. W. ROPER 1,853,882
DIFFERENTIAL METHOD OF INDICATING TROUBLE ON AN OIL FILLED CABLE
Filed Jan. 6, 1928  3 Sheets-Sheet 3

Inventor
Denney W. Roper
By Brown, Boettcher & Dienner
Attys

Patented Apr. 12, 1932

1,853,882

UNITED STATES PATENT OFFICE

DENNEY W. ROPER, OF CHICAGO, ILLINOIS

DIFFERENTIAL METHOD OF INDICATING TROUBLE ON AN OIL FILLED CABLE

Application filed January 6, 1928. Serial No. 245,025.

This invention relates to the matter of indicating and supervising the condition of an electric cable or the like for a power transmission.

The art of electric generation and distribution has been constrained by economic law to centralize generation as much as possible in order to increase efficiency of production, increase reliability and continuity of service and to lower cost.

With the increased centralization of generating capacity the distance of transmission must be extended to cover the required area in which the corresponding consumer demand lies. Hence large amounts of power must be transmitted from such central stations to outlying points for distribution.

The most recent development in the art of electrical transmission and distribution is to interconnect the generating stations of the same company or adjacent companies with long-distance high-voltage transmission lines. For economical reasons the voltage should be above 100 kv. on most such installations. Through the rural district between the cities, this transmission line is always built as an overhead line because of the low cost as compared with an underground line, and until recently this has required that a substation be built at the edge of the urban district in order to reduce the voltage from that of the overhead line to a somewhat lower voltage for which underground cable could be obtained. With the development of the so-called oil-filled cable, it is now possible to secure underground cable for operation at 132 kv. 3-phase, and eliminate the substation at the border of the city. The elimination of this substation enables a marked economy to be made in operation. In addition, the transformers located in this substation add to the drop in the line which must be conpensated by additional voltage regulating devices. With the growth of the city, the substation might have to be moved in a few years, and with the oil-filled cable this situation can be handled by extending the underground line at a very moderate expense as compared with the cost of moving a large substation.

In order to secure insulation of the necessary quality, the oil used for saturating the paper insulation and filling the hollow interior core of the conductor must remain fluid at all temperatures which will be experienced during operation. The oil has a greater coefficient of expansion than the other portions of the cable so that, as the temperature of the cable increases due to seasonal changes or due to the load, the oil will be increased in volume to such an extent that a portion of it must flow from the hollow interior of the cable to suitable reservoirs provided for the purpose, and these oil reservoirs must be so located or devised that they will maintain an oil pressure on the interior of the cable at all times.

Experiments have shown that, although the paper insulation when saturated with a thin oil has a very high quality so that it will stand about double the stresses ordinarily used on high-voltage cable, the life will be very short, that is, only a few hours if the oil is drained from the interior of the conductor while the line is still in operation at normal voltage.

In order to prevent the loss of oil from the entire line in case of a cable failure or external damage, it is desirable to divide the line into a number of sections separated by joints which maintain electrical conductivity of the copper conductors, but which prevent the oil from flowing from one section to another. Such joints are known as stop joints. If the cable should fail or the cable should be damaged externally so as to permit the oil to flow from the section of the cable nearest to one of the feeding reservoirs, the oil would be drained out of the reservoir in a few hours. If the damage to the cable occurs at a longer distance from the feeding reservoir, the time is increased due to the resistance which the hollow conductor forms to the flow of the oil. In order to prevent an electrical failure of the cable resulting from an oil leak, it is necessary that the voltage be removed from the cable before the feeding reservoirs have been drained of their oil; and, in the case of the end sections, with the terminal potheads located about 15 to 20 feet above the ground, it is desirable that the voltage should be removed before the oil supply in the feeding reservoirs has been reduced to such an extent that the interior pressure of the oil at the terminal pothead is below the atmospheric pressure. In such a case, a slight leak at the fittings of the terminal pothead would cause air and moisture to be sucked into the hollow interior of the cable, making it necessary to replace or reimpregnate this end section. The object of my invention is to provide a device which will give a prompt indication of an oil leak in the cable so that the necessary steps can be taken to prevent the drainage of oil to such an extent that the replacing of a section on account of loss of oil will be necessary.

Experience has shown that this internal oil pressure develops leaks at the potheads and at the joints which would not be troublesome with the ordinary type of cable; and, further, that if these leaks received prompt attention, repairs can be made in a few hours, whereas if the leaks were allowed to drain the oil from the reservoirs before being discovered, the repairs might take a few days or a few weeks, depending upon the circumstances and local conditions.

The fact that the cable when drained of oil will not stand normal pressure for more than a few hours before failure occurs makes it necessary to have some devices which will indicate an oil leak and which supplement the ordinary electrical devices which disconnect a cable in case of electrical failure. The alternative is a very frequent inspection of the line, involving considerable expense. The larger portion of this expense can be avoided by the installation of the devices covered by my invention.

In order to maintain the oil in the hollow interior of the cable and in the feeding reservoirs in proper condition, the feeding reservoirs must be made so that they are sealed to prevent the ingress of air and moisture. This makes it necessary to have the reservoirs made of suitable metal so that they will collapse like a bellows as the oil runs out, and this means that the head or pressure of the oil is maintained practically constant. The amount of oil in the reservoirs can, however, be determined by means of indicating devices attached to the collapsible walls of these reservoirs, or by having one end of the reservoirs supported on a spring or other device which will, in effect, weigh the reservoirs.

As the cables are actually installed, it is found expedient to have the feeding reservoirs of such size that they are most economically made in several sections for convenience in handling. This makes it necessary to determine the total amount of the oil in the several reservoirs that are connected to one section of cable.

The three cables containing three conductors of the three-phase underground line are installed in the same conduit and manholes, and have their terminals located as near as convenient where connection is made to the overhead line. The three cables of one section of the line, which sections are of the order of one mile in length, are, therefore, practically of identical length, and as the cables and reservoirs are of the same construction throughout, the amount of oil in the feeding reservoirs is adjusted so that it is practically the same for each of the three cables.

It is also the ordinary condition of three-phase transmission over such high-voltage lines, that the current is very closely the same on all three conductors of the three-phase line. This means that the changes in the temperature of the cable, due to the load, will be practically the same for all three cables. The changes in temperature of the cable due to changes in the temperature of the ground with the varying seasons will also be practically the same, as the three cables are, for other reasons well known to the art, installed in adjacent ducts in the conduit. Under normal conditions, therefore, the changes in the amount of the oil in the feeding reservoirs connected to the three conductors will be practically the same, and when the oil flows from one of the three cables into its feeding reservoir it will also flow in the same direction from the other two cables. If, however, one cable should be damaged externally so as to develop an oil leak, the pressure of the head of oil in its feeding reservoirs will cause the oil to flow out through the leak so that there will immediately be a gradually increasing difference of the amount of oil in this feeding reservoir as compared with the other two. It is, therefore, quite desirable that this difference in the amount of oil in the three feeding reservoirs connected to the three cables in one section of the line should be promptly indicated in order to prevent the damage to the insulation which otherwise might occur, and it is a differential indicator of this character which is covered by my invention.

According to the preferred form of my invention I compare the relative displacement of the insulating oil from one cable with the displacement of oil from the other cables of the same section to determine the above condition. For example, if after starting with equal amounts of oil in the reservoirs the oil in one reservoir or group of reservoirs stands higher than the oil in the corresponding reservoirs or groups of reservoirs for the other phases, either the first has more oil in it than it started with, or the other has less. The former condition can occur if the corresponding section of the cable has risen in temperature above the temperature of the other cable and the oil has expanded into the reservoir. The latter condition could occur in case of leakage. If the contents of the reservoirs increases substantially evenly or decreases substantially evenly normal operation is to be presumed. However, if the increase or the decrease should be too great warning should be given.

My method is a differential method, that is, I transmit a signal to the central station or other convenient location either in case there is an increase or decrease of oil in the reservoir in one cable or cable section as compared with the other or others, or in case there is an abnormal increase or decrease in any one or all of the cables or cable sections.

The preferred way of doing this is to measure the quantity of oil in the reservoir or reservoirs of one phase or section of a phase and compare it with the quantity of oil in the reservoir or reservoirs of the other phases or of the sections of the other phases. In the particular system which I have herein illustrated I show means which is responsive to the weight of oil contained in the reservoirs, but it is to be understood that any other method of comparing amounts, as for example, by comparing levels or by comparing the relative expansion of the reservoirs might be resorted to without departing from my invention.

This differential method of comparing the quantities removes all errors common to the items compared, such, for example, as rise or fall of temperature due to atmospheric or weather conditions and rise or fall of temperature due to equal loading or unloading of the three cables in a transmission line.

In addition to the differential means for indicating the relative difference of oil contents, I provide maximum and minimum signaling means to indicate when an absolute maximum or absolute minimum of oil contents of the reservoir for any one phase has been reached.

I also want to call attention to the fact that my invention is applicable not only to oil filled underground cable, but to all conductors and apparatus employing fluid insulation such as oil. For example, recently the art has taken up oil insulated busses comprising an insulated conductor disposed in an oil filled sheath. My invention is applicable to such busses as well as the particular form of cable which I have herein specifically described.

Because oil is the most suitable fluid insulation at present available for cables I have herein shown my invention as applied to a cable employing this fluid insulation. It is however to be understood that the invention is likewise applicable to cables filled with other fluid insulation it being merely necessary that the insulation used be free flowing, and this is a characteristic of all fluids.

It is apparent that the functioning of my invention is not affected by the substitution of any suitable fluid insulation for the particular insulation now being used, namely, oil.

Now in order to acquaint those skilled in the art with the manner of practicing my invention, I shall describe a specific embodiment of the same in connection with the accompanying drawings, in which:—

Fig. 1 is a diagram of a system embodying my invention and showing for the sake of clearness only a single phase;

Fig. 2 is a diagram of connections showing the mechanism for comparing the expansions of the three phases;

Figure 5:
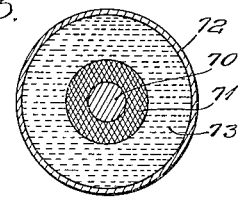
Fig. 5 is a cross section of an oil filled bus.

Referring now to Fig. 1, I have shown at 1 the single phase cable constituting the conductor and the insulation for phase A. In a similar manner the cable for phases B and C is indicated at 2 and 3. Since each phase is the same as every other phase a description of one will suffice for the others. The cable terminates in an oil filled pot head 3, as shown at the left side of the drawing, and at 4 in the right side of the drawing. The cable proper comprises a lead sheath, a hollow conductor and a wrapped insulation between the conductor and the lead sheath, the central part of the cable providing a canal or passageway for oil which keeps the wrapping completely saturated with oil to maintain the insulation of the same. Obviously the cable may be otherwise constructed without departing from my invention. The cable is made up in suitable lengths joined at manholes, as indicated at 5, 5 and the run of cable is sub-divided into sections by stop joints as indicated at 6, 6, these stop joints being suitably constructed to sectionalize the oil filling of the cables. At one end of each section, as for example, 8—8 standpipe connections communicating with the corresponding section of the cable are provided. These standpipe connections lead into reservoirs suitably designed and located at the adjacent ends of two sections. The pressure of oil in the cables may be maintained by a suitable gravity pressure head or pneumatic pressure head or other means for maintaining adequate pressure of oil to exclude air or moisture and insure free flow of the oil into the cable when the same cools. Likewise, the potheads 3 and 4 are provided with standpipe connections 7—7 for maintaining the end sections of cable full of oil at a predetermined pressure. The standpipes 7 and 8 lead upward to suitably located reservoirs 10—10′ which are preferably collapsible and expansible drums performing the function of both reservoirs and expansion tanks for supplying oil such as might be lost by leakage and for taking up and giving out oil as required by the expansion and contraction of the oil in the cable sections. For securing a gravity head, the reservoirs may be maintained in suitably elevated position. I wish to point out that the cable and its oil feeding means is not my invention.

I have observed that the expansion tanks for the respective sections of one phase will receive oil from the cable or discharge oil into the cable at substantially the same rate as those of another phase for changes in temperature due either to atmospheric conditions or to variations in load transmitted by the line, but if the group of tanks for one phase should show an expansion or contraction exceeding that of another phase, heed should be given at once to the condition of the cable, as such differential operation is indicative of an abnormal condition.

Suppose for illustration that the tanks have been adjusted so that the amount of oil in the tanks under the condition of minimum temperature in the winter time and without load is 25 gallons, and that the corresponding amount for the condition of maximum load on the cables is 50 gallons, then, if dependence should be placed upon a device which would act to give an indication only due to a predetermined minimum content of oil in the corresponding reservoir, the remaining oil under such conditions might escape or flow from the tanks before arrangement could be made to replenish the supply. If, however, the signaling scheme be arranged to send in an alarm when the tanks connected to one phase showed an oil content five gallons less than one of the other phases, then, in case of a leak, the alarm would generally be given much earlier. The device covered by this invention is designed to operate upon the loss of a comparatively small amount of oil from one of the phases. It might appear that the reserve would be less in winter time than in the summer, but this apparent difference is offset by the fact that at the lowest temperature the oil has greater viscosity and flows at a slower rate, so that the reserve measured in gallons of oil is lower, but the reserve measured in time for a given leak to empty the tank is not greatly different.

I have provided means for determining the average condition of expansion or contraction by weighing the reservoirs or expansion tanks of each section for each phase and comparing the weight of one section with the weight of the expansion tanks of the corresponding section of another phase or other phases.

Each of the reservoirs 10—10' is suspended in a suitable mounting as, for example, on a yoke 11 connected to a lever 12 pivoted at 13 and counterbalanced by a spring 14. A counter-balancing weight might be employed instead. To the lever 12 I have connected an expansible element 15 by suitable connection 16, so that the expansible element 15 is actuated to change its displacement by movement of the lever 12. The expansible elements 15 are preferably small corrugated metal cylinders closed at their upper ends and connected at their lower ends to tubes 17, which tubes 17 in turn are connected to an oil filled manifold tube 18.

Both of the cylinders 15 for a given section are manifolded to the pipe 18 and this pipe 18 is filled with a suitable fluid such, for example, as oil of the same character as that employed in the cables.

The pipe 18 is preferably provided with an expansion tank 19 and with a filling and regulating chamber 20. The chamber 20 is a collapsible metal drum, which may be expanded or contracted for zero adjustment as by means of the adjusting screw 21.

This zero adjustment is particularly valuable under the following circumstances. Assume that a leak develops in a section of the cable and some of the oil escapes from the cable and the reserve in the reservoirs connected to that section is thereby decreased. The signal means indicates the leakage and thereupon the workmen stop the leak by suitable repairs. Now it may be unnecessary to fill the reservoirs again because there may be sufficient remaining to permit operation to continue for a time. The cost of replenishing the reservoirs is heavy because of the special processes and apparatus required even though only a small amount of oil is to be introduced. Hence, by suitable manipulation of the adjusting screw 21 and the reservoir 20, the displacement of oil in the transmitting tube 18 and connected parts may be compensated for the change of contents in the corresponding reservoirs 10—10' of that particular section.

The pipe 18 is connected to gauge element 22 which has a movable member 23 like a steam gauge pointer, said movable element 23 being actuated as by means of a Bourdon tube or other element responsive to pressure or displacement and the movable element 23 plays between pairs of contacts 24 and 25, mounted on a block 26. The block 26 is movable on a guide 27 being held thereupon in any position by frictional engagement.

Figure 3:
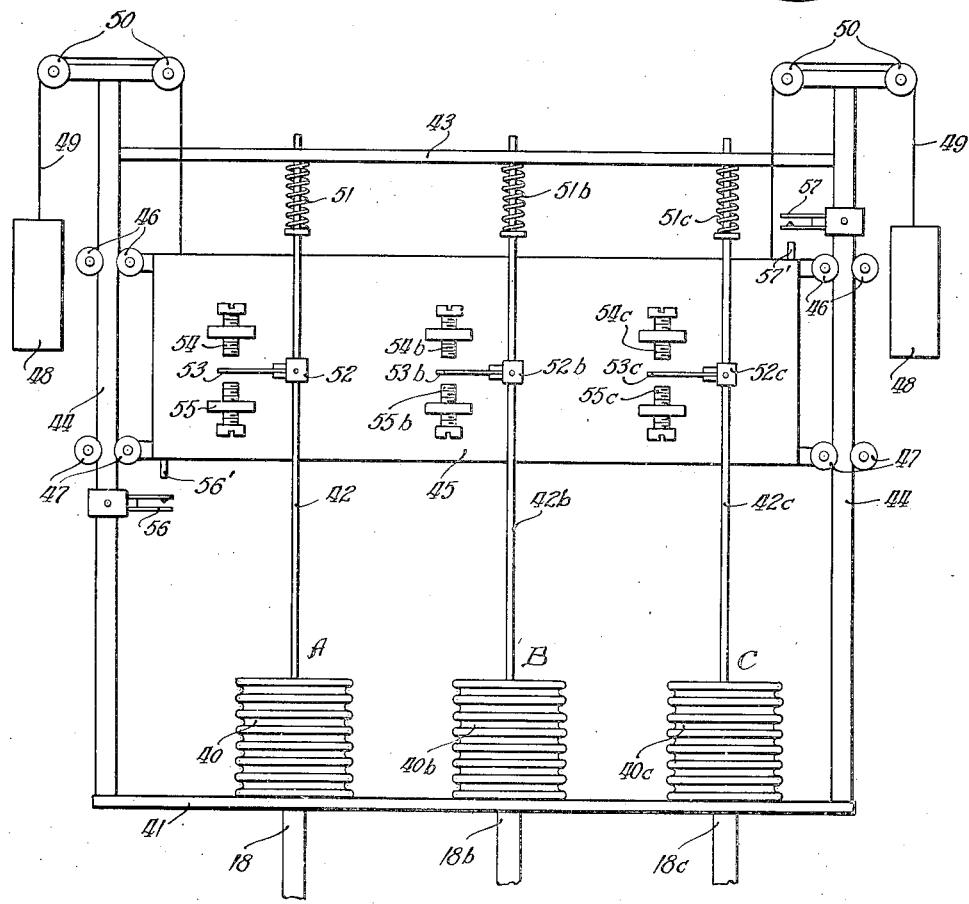
Fig. 3 is a similar diagrammatic illustration of a modified form of the same.

The transmitting tube 18 and its connected parts form a closed system. The expansion tank 19 contains a body of air trapped in the top and, hence, displacement of liquid from the small bellows 15—15 is permitted into the tank 19 with a corresponding rise of pressure in the system to which the gauge 22 is connected. Thus variations of displacement are translated into variations of pressure for moving the Bourdon tubes or like elements in the indicators 22. Obviously, if the active element had sufficient change of capacity as might be provided by a bellows element as shown in Fig. 3 at 40—40b and 40c, the displacement of said bellows would be a measure of the displacement caused in the elements 15—15 by variations of contents of reservoirs 10—10'.

In Fig. 1 I have shown the contacts 24 and 25 so arranged as to close the circuit 28 for tripping the signal sending device 29 upon the occurrence of differences in pressure or displacement of the transmitting or manifold tube 18 for one phase from that of an adjacent phase. The contacts 24'—25' of a corresponding indicator (not shown) have been shown as connected to give such differential indication between two phases. The third phase is not shown in this figure, but by reference to Fig. 2 the complete arrangement will be seen.

As heretofore explained, I provide a differential indicating system where rise or fall of one section beyond the rise or fall of the corresponding sections gives the indication, as for example, by tripping the code sending device 29. The code sending device 29 is a non-interfering fire alarm box of known construction connected in a circuit 29' to one or more supervising stations where the code signal is received.

The diagram of Fig. 1 shows two such signaling boxes for each tower, but it will be apparent that a single box per tower may be arranged to be tripped or operated by the indicating devices of both adjacent sections. The code signal may be received at more than one receiving or supervising station.

In Fig. 1 I have shown the instrument 22 for the A phase and indicated the contact springs 24' and 25' for another phase so that differential operation is required between two gauges for two phases.

In practice the closing of circuit 28 is controlled by differential action between all three phases as will be explained more in detail in connection with Figs. 2 and 3. Obviously it is possible to put all the contacts 24—25 for corresponding sections of each phase in parallel and allow a certain amount of play for each pointer 23 between such contact springs, but that does not give the close supervision that can be obtained by the differential action hereafter illustrated and described in detail.

Preferably, as shown in Fig. 2, the gauges for corresponding sections of the three phases are connected to give an indication only if the pressure or displacement of one manifold tube 18 for one section is relatively low, or relatively high, with respect to another. The manner in which this is accomplished is by connecting the circuit of the responsive magnet 30 through the pairs of springs 24 and 25 of each of the instruments so that the contact pair 24 on one instrument must be closed and the contact pair 25 of another instrument must be closed at the same time in order to complete the circuit. To this end all of the outer springs of the contact pair 25 are connected in parallel with the wire 31 and the other contacts of the contact pair 24 are connected in parallel to the wire 32 and the inner springs of both pairs of each instrument are connected in parallel to an intermediate wire 33. Thus assume that in the instrument 22 in phase A the pointer 23 swings counterclockwise and closes the contact pair 25 and at the same time the pointer 23b of the instrument 22b swings clockwise and closes its contact pair 24b. It will be seen that a circuit is completed from the wire 31 to the contact pair 25 of the instrument 22 to the intermediate wire 33 to the inner contact of the pair 24b and to the outer spring of the pair 24b and thence by wire 32 back through the magnet 30 to the source of current 34. The magnet 30 is thereupon energized, attracting its armature 35 and closing a circuit 36 through an indicating instrument 37 which in the present instance has been shown as a simple annunciator drop. Preferably the magnet 30 controls the tripping of a code sending box 29, as shown in Fig. 1. Obviously, any form of signaling device which is desirable or suitable under the circumstances may be employed. In like manner if the pressure in any one of the three manifold pipes should drop and the pressure in the others advance the circuit will be closed giving the alarm.

I provide also limit contacts 66 and 67 arranged in the path of the movable block 26 to close the controlling circuit of the magnet 30, in case the pressure or displacement in the tube 18 of any particular phase drops to a predetermined limit. In other words, if the pressure or displacement in any of the tubes 18 should drop to a predetermined minimum an alarm is to be given since this would indicate leakage of the insulating oil. In a similar manner the contacts 67 are arranged individually to give an alarm in case of excessive pressure corresponding to a rise of temperature above a predetermined value in any particular phase.

Obviously, since the blocks 26 are connected together, only a single set of springs 66 or 67 are required.

It will be apparent that if the expansion of the three phases is substantially the same then the movable members 23 will swing, for example, in a clockwise direction, and if this expansion is more than sufficient to close the contact springs 24 of each of the indicating devices the mounting blocks 26 on which they are supported will be shifted on a guide or track 27 to the extent required.

Obviously, the mounting blocks 26 of three instruments may be connected together as indicated at 68 so that continued advance of one of the indicator members 23 ahead of the others would serve first to close its corresponding contact pair 24, and next to bring the contact pair 25 of another instrument into engagement with the corresponding pointer 23 to close the circuit at such contact pair.

Figure 4:
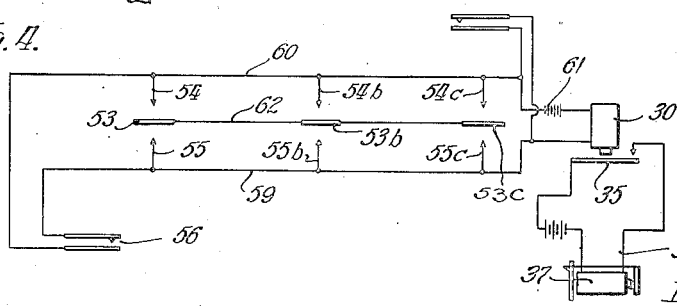
Fig. 4 is a diagram of electrical connections used in connection with Fig. 3.

In Figs. 3 and 4 I have indicated a modified form of the contact mechanism for performing the aforesaid functions.

In this case the three tubes 18 for the three phases are connected to expansible elements in the form of small metal bellows 40 mounted on a common base 41. Each of the small bellows has a rod such as 42 adapted to be moved by contraction and expansion of the corresponding bellows. The upper end of these rods are guided in a cross bar 43 extending between the vertical guides 44. A common base board 45 is guided on the vertical guides 44 as by means of pairs of rollers 46 and 47 and the base board 45 with the parts mounted thereupon is counterbalanced so as to remain in any position on the guides in which it may be moved, as will be described later. The counterbalance for this base board includes the weights 48 suspended on cords 49 tracking over suitable guide pulleys 50 on the upper ends of the guides 44—44.

The expansion of the bellows 40 is controlled by suitable springs 51 so that the rods 42 will closely follow the expansion and contraction of the bellows. An adjustable collar 52 held as by a set screw on the rod 42 carries a spring contact 53 and this spring contact is adapted to make electrical contact with the stationary contact screws 54 or 55, these contacts being adjustable in their mountings on the baseboard 45. A pair of limit contact springs 56 are mounted on the frame and are adapted to be engaged and closed by a pin 56' on the baseboard 45 in case the baseboard 45 moves down far enough to exceed a predetermined position. The position of these contacts 56 are adjustable on the frame so that the said minimum position may be suitably predetermined. In like manner limit springs 56—57 may be employed to indicate when the base board 45 has moved up beyond a predetermined upper position.

The movable contacts 53 of the three phases are all connected together, as indicated in Fig. 4 and the lower contacts for the three phases are all connected together in multiple by a wire 59 and the upper contacts 54 are all connected together in multiple by wire 60. The magnet 30 is included in circuit with its source of current 61 and wires 60 and 59. It controls in turn a circuit 36 through its armature 35 for operating a signal device 37, shown in this case as a simple annunciator drop.

To close the circuit of the magnet 30 requires that the wire 62 which connects the contacts 53 should complete a circuit between the wires 60 and 59. This may be done either by dropping one of the contacts 53 against its corresponding lower contact 55 and at the same time raising one of the contacts 53 into contact with the corresponding upper contact 54 or a circuit may be established by one of the contacts 53 rising or falling in advance of the other contacts or of another contact. This is true because continuous motion of one of the contacts 53 bringing it into engagement with the screws 54 or 55 causes the entire base board 45 to be moved up or down as the case may be, thereby bringing one of the screws 54 or 55 into engagement with another contact 53, whereby the circuit for the magnet 30 will be completed.

The limit contacts 56—57 may be connected to the wires 60 and 59, as shown in Fig. 4, or they may be connected in a separate circuit to give a distinctive signal.

For zero adjustment in case of a loss of oil from one of the sections, the adjustable collar 52 on stem 42 may be shifted.

From the above it will be seen that my system of indication provides means by which the overall increase or decrease of a particular group of reservoirs, as for example, for a single phase, may be ascertained. The means for algebraically adding together the increases or decreases of the reservoirs for the sections of a given phase is in the present case the fluid containing pipe 18 and its connections. It will be obvious that other specific means for performing this integration may be provided as, for example, resistances in an electric circuit may be employed. It will be apparent also to those skilled in the art that instead of weighing the reservoirs to ascertain the contents of the same, level controlled means might be employed instead to indicate the influx or efflux of oil with respect to the reservoirs.

The position of the indicating needle such as 23 for one phase gives an indication of the operation of said phase in absolute terms, that is, the expansion or contraction of the oil in that particular phase without reference to what is going on in the other phases.

Likewise, the position of the individual lever 12 indicates the condition of the contents of the particular associated reservoir 10.

In Fig. 5 I have shown, in section, an oil filled bus. In this case the conductor is surrounded by insulation 71 and contained within a sleeve or sheath 72. This sheath is maintained full of oil for insulating purposes. Suitable expansion tanks or reservoirs are provided for the various sections of the bus. My system is equally applicable to such a bus or system.

I do not intend to be limited to the details shown and described, as I believe it is broadly new to indicate the condition of the insulation of the cable or other conductor and its operating characteristics by taking an integration of the increase or decrease of oil in the reservoirs supplying the standpipes to the individual sections. I intend by the term "cable" to include such sheathed conductor as shown in Fig. 5.

I claim:—

1. The method of indicating the condition of the insulation of a transmission line comprising a plurality of single phase cables which consist in maintaining a body of liquid insulation under head in communication with the interior of each cable, measuring the quantity of said liquid outside of each cable, and giving an indication upon the attainment of a predetermined difference in said amounts.

2. In combination, a plurality of oil filled conductor sheaths, expansion tanks adapted to contain oil insulation for maintaining the sheaths full of oil, and indicating means for indicating the existence of a difference in expansion or contraction of the oil in the reservoirs of one conductor sheath as compared with the oil in the reservoirs of the other conductor sheaths.

3. In combination, three single phase fluid filled cables, each of said cables being subdivided into sections, reservoirs for insulating fluid for maintaining the sections full of insulating fluid, means responsive to the contents of the reservoirs of each phase to indicate the fluid contents of said reservoirs, and means actuated responsive to the occurrence of a difference in indication between phases.

4. In combination, several oil insulated conductors comprising the conductors of a polyphase system of transmission, said conductors being divided into sections, separate expansion tanks connecting with each section of each conductor, said expansion tanks contain insulating liquid, means for measuring the amount of insulating liquid in said tanks, and means for indicating when the difference in amount of insulating oil in the several tanks connected to the different phase conductors in one section exceeds a predetermined amount.

5. In combination, several oil insulated conductors comprising the conductors of a polyphase system of transmission, said conductors being divided into sections, separate expansion tanks connecting with each section of each conductor, said expansion tanks contain insulating liquid, means for measuring the amount of insulating liquid in the said tanks, and means for comparing the amount of oil in the several tanks connected to the respective phase conductors of one section and operating a signal when the difference in the amount of oil in any two of these tanks exceeds a predetermined amount.

6. In combination, a plurality of sheathed conductors, means including expansion tanks for keeping said sheaths full of insulating oil, means for determining the amount of oil in the expansion tanks connected to each conductor sheath, and means for operating a signal or alarm when the difference exceeds a predetermined amount.

7. A polyphase electric line comprising separate oil filled cables for the respective phase conductors, means for maintaining the cables filled with oil, the transfer of the oil in the respective cables varying alike with changing conditions during the normal operation of the line, and means for indicating a difference in the time integral of the flow of the oil in any two of the cables, thereby indicating an abnormal condition.

8. A polyphase electric line comprising separate cables for the respective phase conductors, the cables being filled with an insulating liquid, and each cable including a longitudinal passageway, liquid reservoirs for the respective cables communicating with the passageways for maintaining the cables filled with insulating liquid, quantity of liquid transferred between the cables and the respective reservoirs varying alike during the normal operation of the system, differential means for detecting a difference in the variation of the quantity of liquid in the respective reservoirs, and alarm means controlled by the differential means.

9. A polyphase electric line comprising separate cables for the respective phase conductors, the cables being filled with an insulating liquid, means for maintaining the cables filled and for permitting the flow of the liquid into and out of the cable to maintain the liquid pressure in the respective cables within predetermined limits under varying temperature conditions, the flow of liquid in the respective cables being the same under normal operating conditions, indicating means, and means operative responsive to the occurrence of a predetermined difference in the total amount of liquid passed into or out of any two of the cables for actuating the indicating means.

10. In combination, a plurality of separate high voltage cables each including a conductor in a sheath filled with an insulating liquid, means for maintaining the sheaths full of liquid and permitting the flow of liquid into and out of the sheaths due to the expansion and contraction of the liquid under changing temperature conditions, the changing conditions being the same for the respective cables under normal operation of the system, and differential means for detecting predetermined differences in the total amount of liquid flowing into or out of the respective cables thereby indicating an abnormal condition of any one of the cables.

11. In combination, a plurality of separate high voltage cables each including a conductor in a sheath filled with an insulating liquid, means for maintaining the sheaths full of liquid and permitting the flow of liquid into and out of the sheaths due to the expansion and contraction of the liquid under changing temperature conditions, the changing conditions being the same for the respective cables under normal operation of the system, and differential means for detecting predetermined differences in the total amount of liquid flowing into the respective cables thereby indicating an abnormal condition of any one of the cables.

12. In combination, a plurality of separate high voltage cables each including a conductor in a sheath filled with an insulating liquid, means for maintaining the sheaths full of liquid and permitting the flow of liquid into and out of the sheaths due to the expansion and contraction of the liquid under changing temperature conditions, the changing conditions being the same for the respective cables under normal operation of the system, and differential means for detecting predetermined differences in the total amount of liquid flowing out of the respective cables, upon the expansion of the liquid due to a temperature rise, thereby indicating the occurrence of an abnormal temperature of any one of the cables.

13. In combination, a plurality of sheathed oil insulated conductors subjected to similar heating and cooling conditions under normal operation, separate reservoirs for maintaining the respective conductors filled with oil, and means responsive to the occurrence of a change in the relative contents of the respective reservoirs for indicating the existence of a defect in at least one of the conductors.

14. In combination, a plurality of lengths of cable each containing fluid insulation, the fluid insulation in the respective cable lengths being normally subjected to similar expansion and contraction, separate reservoirs for paying out fluid insulation to and for receiving fluid insulation from the respective cable lengths, and means operated responsive to the occurrence of predetermined differences in the fluid flow in the respective cable lengths, thereby indicating the existence of an abnormal condition on at least one of the cable lengths.

15. In combination, a plurality of fluid containing members wherein under normal conditions the fluid contents vary alike within prescribed limits, means for comparing the fluid content variation of the respective members, and means actuated responsive to the occurrence of a predetermined difference in the variation of the fluid contents of the respective members for indicating the existence of the difference.

16. In combination, a plurality of separate electric cables each including a conductor within a sheath and insulated therefrom by means including liquid insulation and including a passageway longitudinally of the cable for facilitating the flow of liquid insulation, reservoirs connected to the respective cables and subjecting the liquid insulation in the cables to a continuous pressure above atmospheric, said reservoirs being adapted to take up and pay out insulating liquid as the cables undergo thermal changes, the amounts of liquid flowing into and out of the reservoirs of the respective cables bearing a predetermined relative relationship under normal operation of the system, differential means responsive to variations in this relative relationship, alarm means controlled by the differential means, and zero adjusting means for compensating for differences in the initial quantities of liquid in the respective reservoirs.

In witness whereof, I hereunto subscribe my name this 31st day of December, 1927.

DENNEY W. ROPER.